US008438361B2

(12) United States Patent
Goss et al.

(10) Patent No.: US 8,438,361 B2
(45) Date of Patent: May 7, 2013

(54) LOGICAL BLOCK STORAGE IN A STORAGE DEVICE

(75) Inventors: Ryan J. Goss, Lakeville, MN (US); Kevin Gomez, Eden Prairie, MN (US); Mark Allen Gaertner, Vadnais Heights, MN (US)

(73) Assignee: Seagate Technology LLC, Cupertino, CA (US)

( * ) Notice: Subject to any disclaimer, the term of this patent is extended or adjusted under 35 U.S.C. 154(b) by 464 days.

(21) Appl. No.: 12/721,490

(22) Filed: Mar. 10, 2010

(65) Prior Publication Data
US 2011/0225347 A1   Sep. 15, 2011

(51) Int. Cl.
*G06F 12/16* (2006.01)
*G06F 12/02* (2006.01)

(52) U.S. Cl.
USPC ............... 711/170; 711/159; 711/E12.008

(58) Field of Classification Search .......... 711/103, 711/154, 165, E12.001, E12.002, E12.008
See application file for complete search history.

(56) References Cited

U.S. PATENT DOCUMENTS

| | | | | |
|---|---|---|---|---|
| 5,737,742 | A * | 4/1998 | Achiwa et al. ............. | 711/103 |
| 7,849,275 | B2 * | 12/2010 | Danilak .................... | 711/154 |
| 7,949,637 | B1 * | 5/2011 | Burke ....................... | 707/655 |
| 8,339,881 | B2 * | 12/2012 | Danilak .................... | 365/201 |
| 2008/0215800 | A1 * | 9/2008 | Lee et al. .................. | 711/103 |
| 2009/0049234 | A1 | 2/2009 | Oh et al. | |
| 2009/0113112 | A1 | 4/2009 | Ye et al. | |
| 2009/0125671 | A1 | 5/2009 | Flynn et al. | |
| 2009/0182791 | A1 * | 7/2009 | Gorobets .................. | 707/205 |
| 2010/0122019 | A1 * | 5/2010 | Flynn et al. ............... | 711/103 |
| 2010/0262766 | A1 * | 10/2010 | Sprinkle et al. .......... | 711/103 |
| 2010/0268865 | A1 * | 10/2010 | Ramiya Mothilal ...... | 711/103 |
| 2011/0161555 | A1 * | 6/2011 | Olds et al. ................ | 711/103 |
| 2011/0246701 | A1 * | 10/2011 | Kano et al. ............... | 711/103 |
| 2011/0314220 | A1 * | 12/2011 | Matsumura et al. ...... | 711/114 |

OTHER PUBLICATIONS

Chang et al., "Efficient Management for Large-Scale Flash-Memory Storage Systems with Resource Conservation," Term paper from National Chiao-Tung University, Hsin-Chu, Taiwan, published on May 13, 2009, 37 pp.
Rayankula et al., "A block-clustering based approach to implement wear leveling in SSD," Project Report for University of Minnesota CSci 8980: Advanced Storage Systems, published on May 13, 2009, 22 pp.
Jung et al., "Cache over Solid State Disk through DiskSIM," Term Project Final Report from University of Minnesota CSci 8980: Advanced Storage Systems, published on May 13, 2009, 29 pp.
Narang et al., "Integrated Caching and Wear Leveling Algorithm," Term paper, Department of Computer Science, University of Minnesota, published on May 13, 2009, 7 pp.
Mohammed et al., "Improving Hot Data Identification for Hybrid SLC/MLC Device," Term paper from University of Minnesota CSCI 8980: Advanced Storage Systems, published on May 13, 2009, 9 pp.

(Continued)

*Primary Examiner* — Pierre-Michel Bataille
(74) *Attorney, Agent, or Firm* — Hollingsworth Davis, LLC

(57) ABSTRACT

In general, this disclosure relates to storage of logical blocks in a storage device. Aspects of this disclosure describe techniques to monitor the frequency of access of one or more logical blocks referenced by one or more logical block addresses. Based on the frequency of access, in non-limiting aspects of this disclosure, a controller may select one or more physical blocks of a common memory storage block. The storage device may store the logical blocks in the selected physical blocks.

21 Claims, 5 Drawing Sheets

OTHER PUBLICATIONS

U.S. Appl. No. 12/721,466, entitled "Garbage Collection in a Storage Device," filed Mar. 10, 2010.
U.S. Appl. No. 12/765,761, entitled "Data Segregation in a Storage Device," filed Apr. 22, 2010.
Hsieh et al., "Efficient Identification of Hot Data for Flash-Memory Storage Systems," Department of Computer Science and Information Engineering, National Taiwan University, Taipai, Taiwan 106, R.O.C, Feb. 2006, 19 pp.

* cited by examiner

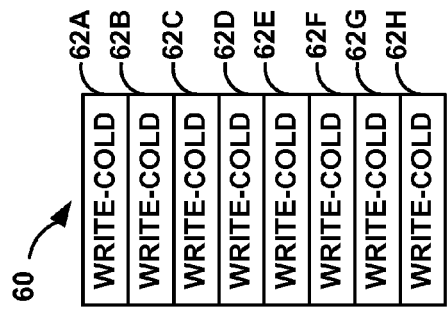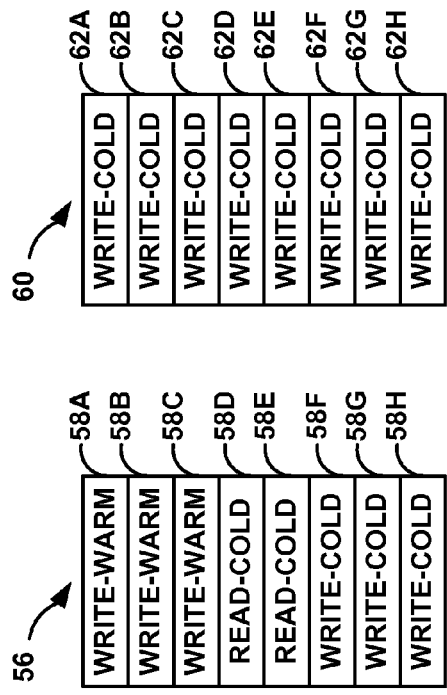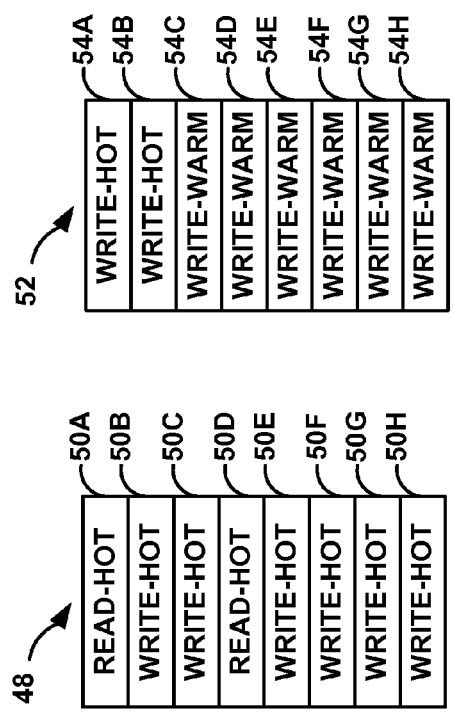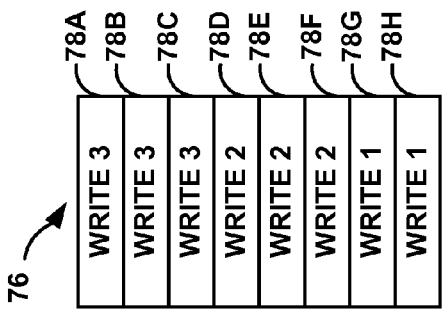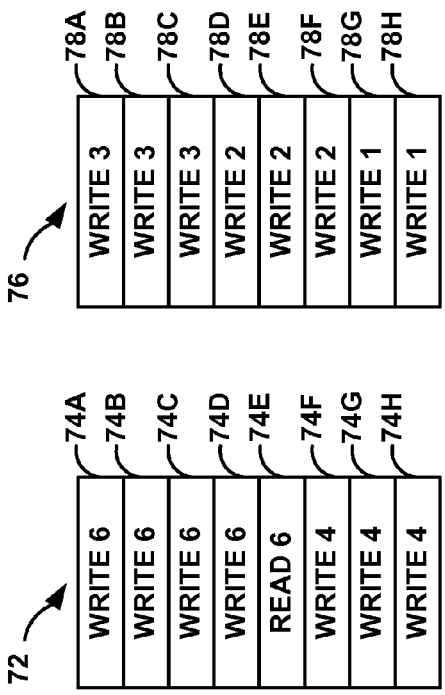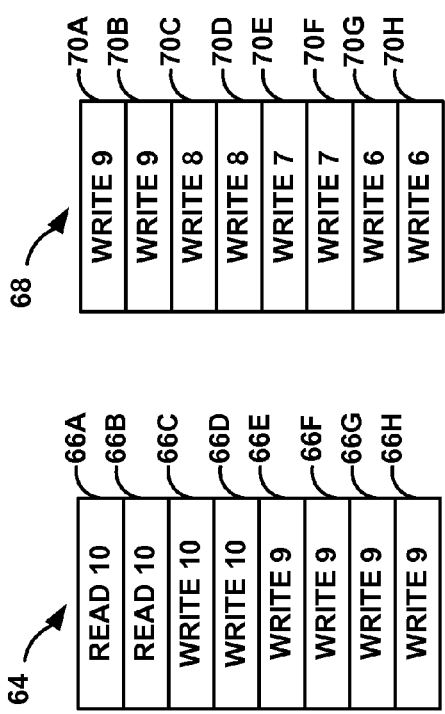

LOGICAL BLOCK STORAGE IN A STORAGE DEVICE

BACKGROUND

Solid state storage devices typically include one or more memory storage blocks. Each of the one or more memory storage blocks includes one or more physical blocks. Each of the one or more physical blocks stores one or more logical blocks data. Once data is stored in a physical block, data cannot typically be written to that physical block until the entire memory storage block (e.g., erasure block) that includes that physical block is recycled. Recycling a memory storage block includes copying the valid data within the memory storage block to another memory storage block and erasing the data within all the physical blocks of the original memory storage block. New data can then be written to the physical blocks of the original memory storage block for storing. Garbage collection generally refers to the act of recycling one or more memory storage blocks.

SUMMARY

In one aspect, the disclosure is directed to a method comprising monitoring, by a device, at least a frequency of read requests of one or more logical blocks referenced by one or more logical block addresses, selecting, by the device, one or more physical blocks of a common memory storage block when at least the frequency of read requests is greater than or equal to a defined read access threshold, and responsive to the selecting, storing, by the device, the one or more logical blocks in the selected one or more physical blocks of the common memory storage block.

In another aspect, the disclosure is directed to a storage device comprising one or more memory blocks, wherein at least one of the one or more memory blocks comprises one or more memory storage blocks, and wherein at least one of the one or more memory storage blocks comprises one or more physical blocks, and a controller configured to monitor at least a frequency of read requests of one or more logical blocks referenced by one or more logical block addresses, select one or more physical blocks of a common memory storage block of the one or more memory storage blocks when at least the frequency of read requests is greater than or equal to a defined read access threshold, and in response to the selection, store the one or more logical blocks in the selected one or more physical blocks of the common memory storage block.

In another aspect, the disclosure is directed to a machine readable storage medium comprising instructions that cause one or more machines to monitor at least a frequency of read requests of one or more logical blocks referenced by one or more logical block addresses, select one or more physical blocks of a common memory storage block when at least the frequency of read requests is greater than or equal to a defined read access threshold, and responsive to the selection, store the one or more logical blocks in the selected one or more physical blocks of the common memory storage block.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 4A-4D and FIGS. 5A-5D provide an example illustration of the manner in which a controller may store logical blocks based on their frequency of access classification.

DETAILED DESCRIPTION

This disclosure is directed to storing logical blocks within a storage device. In particular, this disclosure describes examples of techniques for storing one or more logical blocks within memory storage blocks based on the likelihood of the one or more logical blocks being accessed. The likelihood of a logical block being accessed may be, in certain cases, a function of the number of times that a computing device accessed the logical block address (LBA) that references that logical block, e.g., frequency of access. If the frequency of prior access for a logical block is high, then the likelihood of that logical block being accessed again may be high. If the frequency of prior access for a logical block is low, then the likelihood of that logical block being accessed again may be low. The computing device may access a LBA to read the data from or write data to the logical block that is referenced by that LBA. In non-limiting aspects of this disclosure, logical blocks that have a high frequency of being accessed, such as high frequency of read requests or write requests, may be stored within physical blocks of one or more memory storage blocks, and logical blocks that have a low frequency of being accessed may be stored in physical blocks of one or more different memory storage blocks.

Figure 1:
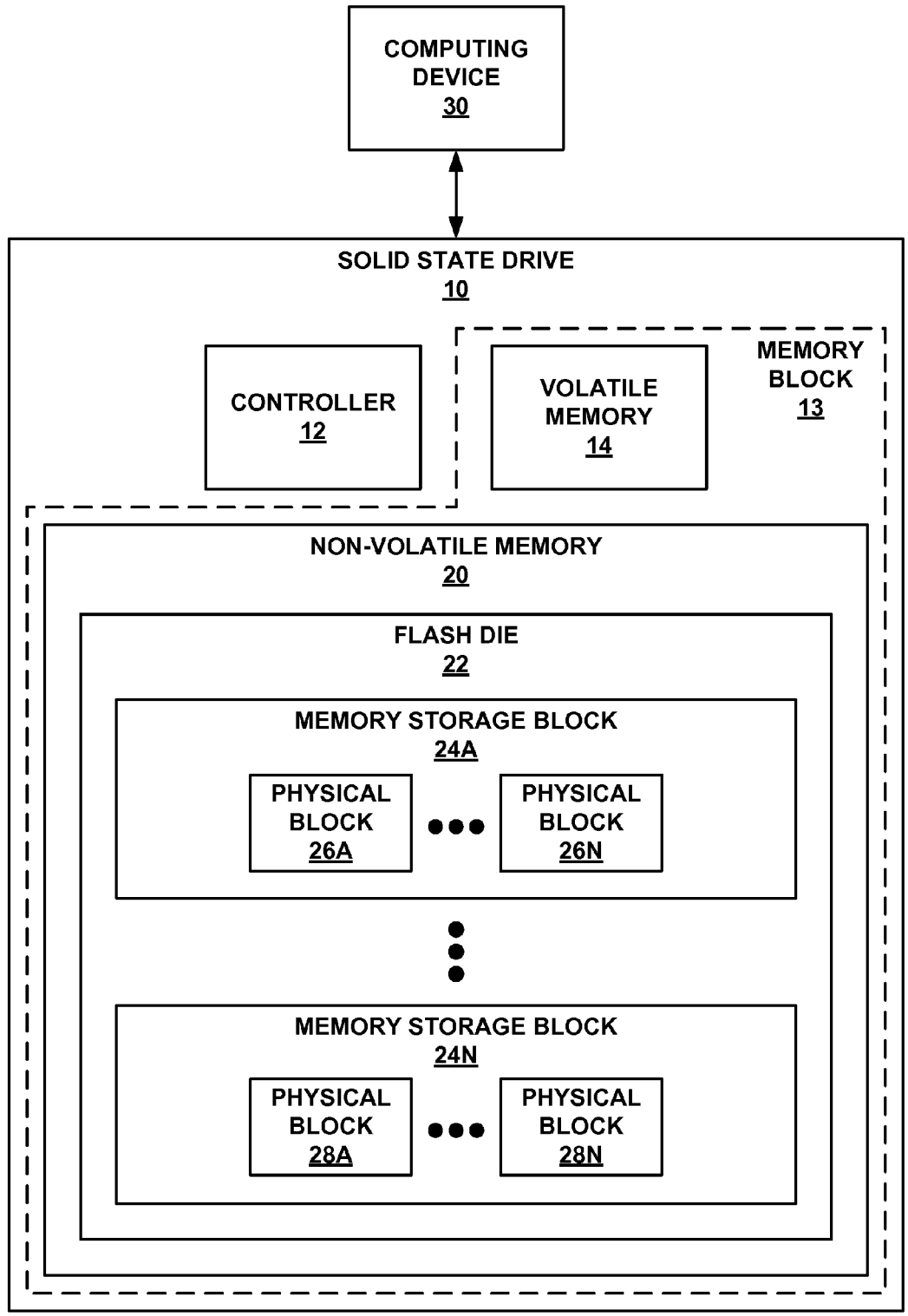
FIG. 1 is a block diagram illustrating an example solid state drive (SSD) that may be used to implement one or more aspects of the present disclosure.

FIG. 1 is a block diagram illustrating an example solid state drive (SSD) 10 that may be used to implement one or more aspects of the present disclosure. SSD 10 may be used as part of an enterprise system. Examples of SSD 10 include, but are not limited to, flash drives, serial advanced technology attachment (SATA) drives, parallel ATA (PATA) drives, and the like. In the example of FIG. 1, SSD 10 includes controller 12 and one or more memory blocks such as memory block 13 that includes volatile memory 14 and non-volatile memory 20. Volatile memory 14 may correspond to random access memory (RAM) such as DRAM. Non-volatile memory 20 corresponds to long-term storage of SSD 10. Non-volatile memory 20 may correspond to NAND flash as one non-limiting example.

Volatile memory 14 and non-volatile memory 20 may be generally referred to as one or more memory blocks, e.g., memory block 13. In general, SSD 10 includes one or more flash dies, such as flash die 22, each of which include a plurality of memory storage blocks 24A-24N ("memory storage blocks 24"). Examples of memory storage blocks 24 include erasure blocks. Flash die 22 may generally comprise one or more semiconductor chips.

Each of memory storage blocks 24 includes a plurality of physical blocks. In the example of FIG. 1, memory storage block 24A includes physical blocks 26A-26N ("physical blocks 26") and memory storage block 24N includes physical blocks 28A-28N ("physical blocks 28"). It should be understood that the letter N in the reference numerals above is a non-negative integer and that the use of N with respect to different reference numerals should not be understood as implying that the number of items are equal. For example, the number of physical blocks 26 is not necessarily equal to the number of physical blocks 28. Likewise, the number of memory storage blocks 24 is not necessarily equal to the number of memory storage blocks 26 or the number of physical blocks 28.

In the example of FIG. 1, SSD 10 includes controller 12. Controller 12 comprises hardware, such as one or more processors, microprocessors, digital signal processor (DSPs), application specific integrated circuits (ASICs), field programmable gate arrays (FPGAs), or any other equivalent integrated or discrete logic circuitry for performing the functions ascribed to controller 12. In some examples, controller 12 may read instructions from non-volatile memory 20 and/or volatile memory 14 that cause controller 12 to perform the various functions described throughout this disclosure. Non-volatile memory 20 and/or volatile memory 14 may be considered as machine readable storage media, processor readable storage media, and/or controller readable storage media comprising instructions that cause one or more machines, processors, or controllers to perform various functions.

Controller 12 may be considered as the one or more machines, processors, or controllers. In other examples, computing device 30 coupled to SSD 10 may implement the functionality ascribed to controller 12. For example, an SSD may not include controller 12, and instead a software driver implemented by an operating system of computing device 30 may perform the functions of controller 12. In this manner, a processor or other control unit separate from SSD 10 may control SSD 10.

In general, SSD 10 stores data for a long-term period in a physical block, such as physical block 26A of memory storage block 24A. SSD 10 may store data from computing device 30, and also provide stored data to computing device 30. Non-limiting examples of computing device 30 include a personal computer, a workstation computer, a laptop computer, or a mainframe computer.

To write and store data, computing device 30 may create logical blocks of data meant to be stored on one or more physical blocks 26, 28. Computing device 30 may reference each one of the logical blocks of data with an identifier such as a logical block address (LBA). Computing device 30 transmits a write request to controller 12 that includes the logical blocks of data to be written and stored and their corresponding LBAs. Controller 12 receives the logical blocks of data and their LBAs and, in some examples, in response to the write request, may temporarily store the logical blocks of data and their LBAs in volatile memory 14. In some examples, controller 12 may repeatedly store logical blocks of data and their LBAs in volatile memory 14 until volatile memory 14 becomes full. After the volatile memory 14 is full, controller 12 may retrieve the logical blocks of data and their LBAs stored in volatile memory 14 and write the logical blocks of data to available physical blocks 26, 28 for storage. An available physical block of physical blocks 26, 28 may be considered as a physical block that does not currently store data.

To write the logical blocks of data, in response to the write request, controller 12 may access physical blocks 26, 28 based on their physical block addresses. In addition, controller 12 may map the LBA of the logical block of data that is written to one or more physical blocks 26, 28 to the physical addresses of the one or more physical blocks 26, 28. For example, computing device 30 may address a logical block of data as LBA1. Controller 12 may store the logical block of data within physical block 26A, assuming physical block 26A is available and the number of bits that can be stored in physical block 26A is greater than or equal to the number of bits of the logical block of data. The physical address for physical block 26A may be addressed as memory storage block 24A, physical block 26A, or in short form, MSB24A PB26A. In this example, controller 12 maps LBA1 to the physical address MSB24A PB26A because that is where the logical block of data is to be stored. Controller 12 may write additional logical blocks of data in a substantially similar manner.

In some cases, the logical block of data may be compressed by controller 12 prior to storage in physical blocks 26, 28. The compressed data may be temporarily stored in volatile memory 14, and then may be subsequently stored in physical blocks 26, 28. In some instances, controller 12 may decompress the compressed data prior to storage in physical blocks 26, 28; however, this may not be required in all examples and controller 12 may store the compressed data in physical blocks 26, 28.

For purposes of clarity and illustration, in aspects of this disclosure the data, stored in physical blocks 26, 28, is described as being decompressed data. However, the techniques of this disclosure are not limited to examples where the data, stored in physical blocks 26, 28, is decompressed. In examples where the data stored in physical blocks 26, 28 is compressed, controller 12 may decompress the data prior to providing the data to computing device 30. In some examples, rather than controller 12 decompressing the data, controller 12 may provide the compressed data to computing device 30, and computing device 30 may decompress the data.

Controller 12 may store the map of the LBAs and the physical block addresses as metadata. Controller 12 may store the metadata in various storage locations within SSD 10. For example, controller 12 may store the metadata within volatile memory 14, one or more headers of memory storage blocks 24, one or more physical blocks 26, 28, or some other storage block within non-volatile memory 20 (not shown in FIG. 1). As another example, controller 12 may designate one or more memory storage blocks 24 as memory storage blocks for storing the metadata. Moreover, controller 12 may store portions of the metadata throughout different storage locations. For example, some of the metadata may be stored in non-volatile memory 20 and some of the metadata may be stored in the designated memory storage blocks 24. Controller 12 may utilize other techniques to store the metadata, and the examples listed above should not be considered limiting.

After writing logical blocks of data to physical blocks 26, and mapping the LBAs of the logical blocks of data to physical block addresses, controller 12 may erase volatile memory 14. Controller 12 may then receive more logical blocks of data for storage, and write physical blocks 26, 28 and map LBAs to physical block addresses utilizing techniques substantially similar to those described above.

In some examples, rather than temporarily storing the logical blocks of data and their LBAs in volatile memory 14 until volatile memory 14 is full, controller 12 may store logical blocks of data and their LBAs in volatile memory 14 and retrieve the logical blocks of data and the LBAs stored in volatile memory 14 before volatile memory 14 is full. Controller 12 may write the logical blocks of data to available physical blocks 26, 28 and map the LBAs of the logical blocks of data to the physical addresses of physical blocks 26, 28 that store the logical blocks of data. Controller 12 may store the map as metadata.

In some examples, controller 12 may store the logical blocks of data within physical blocks 26, 28 without temporarily storing the logical blocks of data within volatile memory 14. In such examples, controller 12 may identify available physical blocks 26, 28 that can store data. Controller 12 may write the logical blocks of data to the available physical blocks 26, 28 and map the LBAs of the logical blocks of data to the physical addresses of physical blocks 26, 28 that store the logical blocks of data. Again, controller 12 may store the map as metadata.

To read back a logical block of data, computing device 30 may transmit a read request that includes a request for the desired logical block of data to controller 12 based on the LBA of the desired logical block of data. For example, the logical block address for a desired logical block of data may be LBA1. Computing device 30 may transmit a request for the logical block of data addressed as LBA1. In response, controller 12 may access the map stored as metadata to determine which physical address is mapped to the requested LBA, e.g., which physical address is mapped to LBA1. After identifying which physical address is mapped to LBA1, e.g., MSB24A PB26A, controller 12 may retrieve the logical block of data stored in physical block 26A of memory storage block 24A. Controller 12 may then transmit the retrieved data to computing device 30. In this manner, computing device 30 is capable of retrieving stored data.

When computing device 30 changes, e.g., rewrites, data in a logical block, the changed data may not be stored in same physical block where it was stored before. Instead, the rewritten data is stored on one or more different, empty physical blocks 26, 28 and the metadata is updated to indicate that the LBA maps to the address of the physical block where the rewritten data is stored. For example, assume that a logical block with a logical block address of LBA2 is stored within physical block 28A of memory storage block 24N. Accordingly, controller 12 mapped LBA2 to MSB24N PB28A. Computing device 30 may read the data stored in physical block 28A of memory storage block 24N by addressing LBA2. Computing device 30 may then rewrite the logical block that is addressed by LBA2. Next, computing device 30 may store the re-written logical block in SSD 10.

To rewrite the data, computing device 30 may transmit the data, e.g., rewritten logical block, and LBA2 to controller 12. Controller 12 may receive the logical block of data and LBA2, and store the logical block of data in physical bock 26B of memory storage block 24A, assuming physical block 26B is empty. Controller 12 may not be able to store the rewritten logical block of data within physical block 28A of memory storage block 24N. Controller 12 may update the map stored as metadata to indicate that LBA2 maps to MSB24A PB26B.

The original logical block of data, e.g., the logical block of data before it was rewritten, remains in the original physical block, e.g., physical block 28A. However, the data within the original physical block is considered invalid or stale because the LBA no longer maps to the address of original physical block but instead maps to the address of the physical block that stores the rewritten data, e.g., physical block 26B.

In non-limiting aspects of this disclosure, controller 12 may monitor the frequency of access of one or more logical blocks by computing device 30. For example, controller 12 may monitor the number of times one or more LBAs are accessed based on the number of times computing device 30 transmits a read request for logical blocks of data associated with the LBA, e.g., frequency of read requests, and/or a write requests, e.g., frequency of write requests for logical blocks of data associated with the LBA. For example, controller 12 may maintain a counter for each LBA and increase the count each time computing device 30 accesses a particular logical block based on its LBA. Furthermore, controller 12 may monitor whether the request is a read request or a write request for each logical block.

In this manner, controller 12 may monitor the number of times logical blocks are accessed based on the number of times computing device 30 writes data to the one or more logical blocks and/or reads data of the one or more logical blocks. Controller 12 may monitor the frequency of access of the one or more logical blocks based on their respective LBAs. For example, computing device 30 may read from the one or more logical blocks by requesting the data from controller 12 based on the LBAs of the one or more logical blocks. Computing device 30 may write data to the one or more logical blocks by transmitting data to controller 12 based on the LBAs of the one or more logical blocks. By monitoring the number of times computing device 30 accesses each one of the LBAs, controller 12 may monitor the frequency of access for each logical blocks referenced by their respective LBAs.

Controller 12 may classify the logical blocks of data based on their frequency of access and one or more defined thresholds. For example, controller 12 may classify a logical block that is read from greater than or equal to a read access threshold as read-hot logical block, and classify a logical block of data that is read less than or equal to the read access threshold as read-cold logical block. Similarly, controller 12 may classify a logical block that is written to greater than or equal to a write access threshold as write-hot logical block, and classify a logical block of data that is written to less than or equal to the write access threshold as write-cold logical block. In some examples, the read access threshold and the write access threshold may be different, but aspects of this disclosure need not be so limited. The write access threshold may be 100 write accesses and the read access threshold may be 10,000 read accesses, as one example, though other thresholds are possible.

In some examples, rather than classifying logical blocks as read-hot, read-cold, write-hot, or write-cold, controller 12 may classify logical blocks at various gradient levels. There may be multiple thresholds utilized to classify logical blocks as, for example, read-warm logical blocks or write-warm logical blocks, as well as read-hot logical blocks, write-hot logical blocks, read-cold logical blocks, or write-cold logical blocks. For example, if the frequency of read requests for a particular logical block is less than a first read access threshold, controller 12 may classify that logical block as read-cold. If the frequency of read requests for that logical block is greater than or equal to the first read access threshold, but less than a second read access threshold, controller 12 may classify that logical block as read-warm. If the frequency of read requests for that logical block is greater than or equal to the second read access threshold, controller 12 may classify that logical block as read-hot. Controller 12 may classify a logical block as write-cold, write-warm, and write-hot in a substantially similar manner, albeit based on the first and second write access thresholds which may be different than first and second read access thresholds, but not necessarily so.

As used in this disclosure, terms such as read-hot, write-hot, read-warm, write-warm, read-cold, write-cold, e.g., temperature of a logical block, should not be construed as the physical temperature of a logical block. Instead, these terms are used in this disclosure to classify the frequency of access of the logical blocks by computing device 30, or some other device.

Furthermore, in some examples, controller 12 may classify logical blocks at even finer gradient levels. Rather than classifying logical blocks based on a temperature level, e.g., hot, warm, cold, controller 12 may classify logical blocks based on a numerical classification. For example, if a logical block is read less than a first read access threshold, controller 12 may classify that logical block with a numerical classification of 1. If the logical block is read greater than or equal to the first read access threshold, but less than a second read access threshold, controller 12 may classify that logical block with a numerical classification of 2, and so on up to a classification of 10, as one example. Controller 12 may similarly classify logical blocks based on the number of times the logical blocks are written in a substantially similar manner.

Accordingly, based on the example techniques described above, controller 12 may monitor the frequency of access, such as frequency of read requests and/or frequency of write requests for each one of the one or more logical blocks of data referenced by their associated LBAs. Other techniques to monitor the frequency of access of the logical blocks may be possible. Aspects of this disclosure should not be considered limited to the monitoring examples provided above.

Furthermore, controller 12 may store the frequency of access classification for one or more logical blocks in memory block 13. Controller 12 may store the frequency of access classification for one or more logical blocks in memory block 13 based on the type of the frequency of access. For example, based on the frequency of read requests, some of the logical blocks may be read-hot, read-warm, or read-cold, and based on the frequency of write requests, some of the logical blocks may be write-hot, write-warm, or write-cold.

Controller 12 may store the frequency of access classification in volatile memory 14 or non-volatile memory 20. For example, controller 12 may store the frequency of access classification in one or more physical blocks 26, 28. Controller 12 may store the frequency of access classification as headers in the logical blocks stored on one or more physical blocks 26, 28. Controller 12 may dedicate one or more memory storage blocks 24 as a memory storage block for storing the frequency of access classification. Any technique to store the classification for one or more logical blocks may be possible, and aspects of this disclosure should not be considered limited to the storage examples provided above.

Controller 12 may select physical blocks 26, 28 for storage based on the frequency of access of a logical block and the frequency of access of logical blocks stored in physical blocks 26, 28. As described above, controller 12 may classify the logical blocks based on whether the frequency of access for those logical blocks is greater than or equal to the one or more frequency of read request thresholds and/or frequency of write request thresholds. Controller 12 may store one or more logical blocks in physical blocks 26, 28 based on the frequency of access classification of the one or more logical blocks. Controller 12 may store logical blocks with a relatively high frequency of access in a common memory storage block, and store logical blocks with a relatively low frequency of access in a different, common memory storage block.

For example, controller 12 may store logical blocks with high frequency of access in physical blocks 26 of memory storage block 24A and store logical blocks with low frequency of access in physical blocks 28 of memory storage block 24N. Controller 12 may determine whether the logical blocks are accessed frequently, e.g., high frequency of access, or accessed infrequently, e.g., low frequency of access, based on the frequency of access classification, which is based on one or more read request thresholds and/or write request thresholds.

In some instances, the number of logical blocks with a high frequency of access may be greater than the number of physical blocks 26, 28. For example, the number of logical blocks classified as write-hot and/or read-hot may be greater than the number of physical blocks 26. In such instances, controller 12 may store logical blocks classified as write-hot and/or read-hot in physical blocks 26 until all the physical blocks include data that is write-hot and/or read-hot. Controller 12 may then select another group of physical blocks in a common memory storage block to store the remainder of logical blocks classified as write-hot and/or read-hot. Controller 12 may repeat this process until all the logical blocks classified as write-hot and/or read-hot are stored. In some instances, after controller 12 selects physical blocks, e.g., physical blocks 26 or 28, of a common memory storage block, e.g., memory storage block 24A or 24N, for storage and stores the logical blocks in the selected physical blocks of the common memory storage block, the memory storage blocks may include physical blocks that do not include data.

For example, assume there are eighteen logical blocks classified as read-hot or write-hot, that physical blocks 26 and 28 are currently empty, and that there are fourteen physical blocks 26 and fourteen physical blocks 28. In this example, controller 12 may store fourteen of the eighteen logical blocks in physical blocks 26, e.g., physical block 26A through 26N, because physical blocks 26 belong to a common memory storage block, e.g., memory storage block 24A. Controller 12 may store the remaining four logical blocks in physical blocks 28, e.g., physical block 28A through 28D, because physical block 28A through 28D belong to a common memory storage block, e.g., memory storage block 24N.

For the remaining ten physical blocks 28, e.g., physical block 28E through 28N, controller 12 may store logical blocks classified as write-warm or read-warm. If there are not sufficient logical blocks classified as write-warm or read-warm to populate all of the physical blocks of a common memory storage block, controller 12 may populate the remaining physical blocks with logical blocks classified as write-cold or read-cold.

In examples where controller 12 classifies the frequency of access of logical blocks based on a numerical classification, controller 12 may store the logical blocks in physical blocks 26, 28 in a substantially similar manner as described above. However, the selection of physical blocks 26, 28 of a common memory storage block may be based on the numerical classification rather than the temperature level.

Controller 12 may store logical blocks based on the frequency of access classification in common memory storage blocks, e.g., memory storage blocks 24A, 24N continuously, e.g., in response to a write request, a request to store generated by controller 12, or in response to garbage collection. Initially, logical blocks stored in physical blocks 26, 28 or logical blocks recently generated by computing device 30 may initially be classified as cold because those logical blocks are yet to be accessed. However, over time, the number of times one or more logical blocks are accessed, via its LBA, increases and controller 12 may change the classification for the one or more logical blocks based on number of times the one or more logical blocks is accessed, e.g., frequency of access.

As described above, once a logical block is stored in one of physical blocks 26, 28, e.g., physical block 26A, and then subsequently rewritten, that logical block can no longer be stored in the same physical block, e.g., physical block 26A. Instead, that logical block is stored in a new, empty physical block. Controller 12 may determine which physical block to store the rewritten logical block based on the classifications of that logical block and other logical blocks currently stored in physical blocks of a memory storage block.

In some examples, controller 12 may store logical blocks that are similarly classified in a common memory storage block, e.g., memory storage block 24A or 24N. For example, assume that a first logical block is rewritten, based on the frequency of write requests for the first logical block, controller 12 classified the first logical block as write-hot. Further, assume that a second logical block stored in physical block 26A is read-hot and remaining physical blocks of memory storage block 24A are empty, e.g., physical blocks 26B-26N. Controller 12 may store the first logical block in one of physical blocks 26B-26N because the first logical block and the second logical block comprise a relatively high frequency of access, e.g., write-hot and read-hot, respectively.

In aspects of this disclosure, although initially the logical blocks may be disturbed randomly throughout each of the physical blocks 26, 28; over time, logical blocks with similar classifications may be grouped in a common memory storage block. For example, assume that a first logical block, classified as write-hot, is initially stored in memory storage block 24A, and that most of the logical blocks in memory storage block 24N are classified as write-hot and/or read-hot. When the first logical block is rewritten, controller 12 may store that logical block in an empty physical block 28 that belongs to a memory storage block 24N, because memory storage block 24N stores other logical blocks that controller 12 classified as write-hot and/or read-hot. In this manner, over time, all of the physical blocks 28 of memory storage block 24N may store logical blocks classified as write-hot and/or read-hot.

As another example, assume that a second logical block, classified as write-cold, is initially stored in memory storage block 24B (not shown), and that most of the logical blocks in memory storage block 24C (not shown) are classified as write-cold and/or read-cold. Further assume that when the second logical block is rewritten, its classification does not change because the second logical block has not been accessed sufficient times for controller 12 to classify it as write-warm or write-hot.

When the second logical block is rewritten, controller 12 may store the second logical block in a empty physical block of memory storage block 24C, because memory storage block 24C stores other logical blocks that controller 12 classified as write-cold and/or read-cold. In this manner, over time, all of the physical blocks of memory storage block 24C may store logical blocks classified as write-cold and/or read-cold. Controller 12 may store other logical blocks with similar classifications in a substantially similar manner.

In the previous examples, in response to a write request, controller 12 stored a logical block in an empty physical block of a memory storage block based on the frequency of access classification of the logical block and the frequency of access classification of logical blocks stored in physical blocks of that memory storage block, e.g., controller 12 stored a logical block classified as write-hot in a memory storage block that stores logical blocks classified as write-hot and/or read-hot. Garbage collection is referred to as the technique to empty all physical blocks of a memory storage block. Garbage collection may occur in response to a request generated by controller 12 or by some other device. In some examples, memory storage blocks that include a large number of physical blocks with invalid data may be candidates for garbage collection because no new data may be stored in physical blocks that include invalid data until the entire memory storage block is erased.

As described above, when a logical block is rewritten, the physical block that previously stored that logical block is considered to contain invalid data, and the rewritten logical block is stored in a different physical block. To reuse a physical block that contains invalid data of a memory storage block, controller 12 transfers all valid data stored in physical blocks of that one of memory storage blocks 24 into physical blocks of a different one of memory storage block 24, and erases all the physical blocks in the original one of memory storage blocks 24. This process is referred to as garbage collection, and may be performed on memory storage blocks with a relatively large number of physical blocks that include invalid data.

In some examples, during data transfer, error correction codes (ECCs) may be employed to correct any errors in the data so that correct data is stored during garbage collection. Also, during data transfer, the map is updated to reflect that the LBAs associated with the valid data are now mapped to physical addresses of the physical blocks of the different ones of memory storage blocks 24. Subsequently, all the physical blocks, of the erased memory storage block are empty (e.g., store no data), and new data can be written to the empty physical blocks.

Controller 12 may determine when it is appropriate to perform garbage collection. As described above, after garbage collection, physical blocks that previously stored invalid data are empty and data can be written to those empty physical blocks. Accordingly, garbage collection may be considered as freeing memory space for storage. Controller 12 may determine that garbage collection is needed when more physical blocks 26, 28 are needed than are currently available, e.g., empty.

Over time, as computing device 30 writes data, reads data, and rewrites data, memory storage blocks 24 include physical blocks 26, 28 that store valid or invalid data, or no data, e.g., empty. Again, physical blocks 26, 28 that store invalid data still include data, but that data is not usable because no LBA is mapped to physical blocks 26, 28 that store the invalid data. Computing device 30 may need to write additional data; however, there may not be sufficient physical blocks 26, 28 that are empty to store the additional data. To allow computing device 30 to write and store the data, controller 12 may initiate garbage collection to free up one or more memory storage blocks 24 so that physical blocks 26, 28 are empty and available to store data. Controller 12 may initiate garbage collection, e.g., request garbage collection, based on the number of physical blocks that are available for storing data.

For example, controller 12 may monitor the number of empty physical blocks, e.g., monitor the number of physical blocks 26, 28 that are empty. If the number of empty physical blocks is less than a threshold, e.g., less than 10% of the physical blocks are empty, controller 12 may initiate garbage collection to free up physical blocks for storing data. As another example, controller 12 may monitor the number of physical blocks, e.g., monitor the number of physical blocks 26, 28, that store invalid data. If the number of physical blocks that store invalid data that is greater than a threshold, e.g., more than 70% of the physical blocks store invalid data, controller 12 may initiate garbage collection to free up physical blocks for storing data.

The thresholds of 10% and 70% are provided for example purposes only, and should not be considered as limiting. Controller 12 may be programmed with the threshold(s). The threshold(s) may also be variable and set by computing device 30, or some other device. Any technique known in the art to program controller 12 may be utilized to program controller 12 with the threshold(s).

In some examples, controller 12 may not determine when garbage collection is needed. Rather, computing device 30 may determine that garbage collection is needed. For example, computing device 30 may be planning on writing a substantial amount of data. Computing device 30 may request controller 12 to initiate garbage collection to free up memory space. In some examples, the request for garbage collection may be provided by some other device, e.g., another SSD. Also, in some examples, controller 12 may be preprogrammed to periodically perform garbage collection. Accordingly, as used in this disclosure, a request for garbage collection may be generated by computing device 30, controller 12, or some other device.

After garbage collection, controller 12 may designate the original memory storage blocks 24 for storage of write-hot, read-hot logical blocks of data or write-cold, read-cold logical blocks of data, as one example. In examples where logical blocks are designated by a numerical classification, controller 12 may designate the original memory storage blocks 24 based on the numerical classification. Controller 12 may then store logical blocks in the just erased memory storage block based on the classification of the logical blocks and the designation of the memory storage block. For example, if the memory storage block is designated to store write-hot and/or read-hot data, controller 12 may store logical blocks of data classified as write-hot and/or read-hot data in that memory storage block.

In some examples, subsequent to garbage collection, controller 12 may store logical blocks, based on their classification and the designation of the just erased memory storage block, as the logical block are rewritten and provided to controller 12. For example, assume that controller 12 erased memory storage block 24A and designated memory storage block 24A to store logical blocks classified as write-hot or read-hot. In this example, when a logical block, classified as write-hot, is rewritten, controller 12 may store that rewritten logical block in memory storage block 24A. However, aspects of this disclosure are not limited to this example.

In some examples, in response to garbage collection, rather than or in addition to waiting for a logical block, classified as write-hot, to be rewritten before controller 12 stores that logical block, controller 12 may store logical blocks classified as write-hot and/or read-hot before they are rewritten. For example, assume that memory storage block 24N includes one or more logical blocks classified as read-hot and/or write-hot. In response to garbage collection, controller 12 may erase physical blocks 26 of memory storage block 24A. In addition to erasing physical blocks 26, controller 12 may retrieve the logical blocks classified as read-hot and/or write-hot from physical blocks 28 of memory storage block 24N and store them in physical blocks 26 of memory storage block 24A. Controller 12 may execute this storage before the logical blocks stored in physical blocks 28 are rewritten.

As described above, in aspects of this disclosure, the logical blocks may be initially classified as cold because computing device 30 has yet to access them. However, over time, as computing device 30 accesses the logical blocks, the classification for the logical blocks may change. Controller 12 may classify the logical blocks as write-hot, write-warm, write-cold, read-hot, read-warm, or read-cold to indicate the frequency of access of the logical blocks. In some examples, rather than a temperature classification, a numerical classification, or some other classification may be utilized to indicate the frequency of access of the logical blocks.

In aspects of this disclosure, over time, logical blocks with similar classifications may be stored in common memory storage blocks. For example, logical blocks classified as read-hot and/or write-hot may be stored in common memory storage blocks, and logical blocks classified as read-cold and/or write-cold may be stored in common memory storage blocks. The storage of logical blocks in common memory storage blocks may occur in response to a write request from computing device 30 and/or in response to a request for garbage collection. The request for garbage collection may be provided by controller 12 or some other device.

Aspects of this disclosure may mitigate against read disturb and reduce write-amplification. When a physical block of memory storage block is read a relatively large number of times, the data of the logical block stored that physical block may become corrupt and may also corrupt data of logical blocks stored in other physical blocks of that memory storage block. For example, if physical block 26A is read a relatively large number of times, the data of the logical block stored in physical block 26A may become corrupt, as well as, the data of the logical blocks stored in physical blocks 26B-26N. This corruption of data, due to a relatively large number of reads of the physical block, is referred to as read disturb. In aspects of this disclosure, logical blocks classified as read-hot may cause read disturb because physical blocks that store logical blocks classified as read-hot may be read a sufficient number of times to cause read disturb.

As described above, in aspects of this disclosure, a memory storage block may be designated to store logical blocks classified as read-hot and/or write-hot. There may be higher likelihood that logical blocks classified as write-hot may be rewritten, rendering the physical blocks that stored those logical blocks as storing invalid data. Memory storage blocks 24 that include more physical blocks with invalid data compared to other memory storage blocks may be better candidates for garbage collection. Accordingly, it may be more likely for memory storage blocks 24 that store logical blocks classified as write-hot and/or read-hot to be garbage collected. When one of memory storage blocks 24 that store logical blocks classified as read-hot and/or write-hot is garbage collected, the number of reads of the physical block of that one of memory storage blocks 24 may be reset because the physical blocks of that one of memory storage block 24 are empty.

For example, assume that physical block 26A stores data that is classified as read-hot and physical blocks 26B-26N store data that is classified as write-hot. Further assume that physical block 26A is read multiple times and may potentially cause read disturb. Assume that the logical blocks stored in physical blocks 26B-26N are rewritten because the logical blocks stored in physical blocks 26B-26N are classified as write-hot. In this example, after the logical blocks stored in physical blocks 26B-26N are rewritten, physical blocks 26B-26N store invalid data, and memory storage block 24A may be a candidate for garbage collection. After garbage collection, the number of times physical block 26A is read is reset back to zero because physical block 26A is now empty. By grouping logical blocks classified as read-hot with logical blocks classified as write-hot in a common memory storage block, the chances of read disturb may be reduced because the likelihood of performing garbage collection on that common memory storage block is relatively high, and garbage collection may be performed on that memory storage block before the occurrence of read disturb. In this manner, read disturb may be mitigated. The read disturb mitigation is described in more detail with respect to FIGS. 2 and 3.

After garbage collection, the classification of a logical block may remain the same, but this may not be the case in every example. For example, if a logical block is classified as read-hot, it will remain read-hot after garbage collection. However, the number of times that the physical block that originally stored the logical block classified as read-hot is reset to zero; the classification of the logical block itself may not change.

In some examples, after garbage collection, the classification of a logical block may change. For example, if a logical block is classified as read-hot and is transferred during garbage collection, the classification of that logical block may be reset to read-cold. Because that logical block is in a new physical block, the likelihood of that new physical block experiencing read disturb in the near future may be low as that physical block would need to be read many times before read disturb occurs. Accordingly, in some examples, controller 12 may change the classification of a logical block from read-hot to read-cold after garbage collection.

For logical blocks classified as write-hot, the classification for those logical blocks may not change after garbage collection, in some examples. Even after a logical block is transferred from one physical block to a new physical block during garbage collection, the likelihood that that logical block may be written to again may still be relatively high.

As noted above, aspects of this disclosure may mitigate against read disturb, as well as, reduce write amplification. Write amplification may be the number of physical blocks whose data needs to be transferred during garbage collection. Write amplification may create wear on the physical blocks. Accordingly, it may be beneficial to reduce the number of logical blocks that need to be transferred during garbage collection.

In aspects of this disclosure, logical blocks classified as write-hot and/or read-hot may be stored in physical blocks of a common memory storage block. In aspects of this disclosure, logical blocks classified as write-hot may be rewritten more often, and there may be higher likelihood that the memory storage block that stores the logical blocks classified as write-hot and/or read-hot include many physical blocks that store invalid data and few physical blocks that store valid data. Therefore, during garbage collection, controller 12 may need to transfer few logical blocks of data since most of the physical block may contain data that is invalid. The reduction in write amplification is described in more detail with respect to FIGS. 2 and 3.

Figure 2:
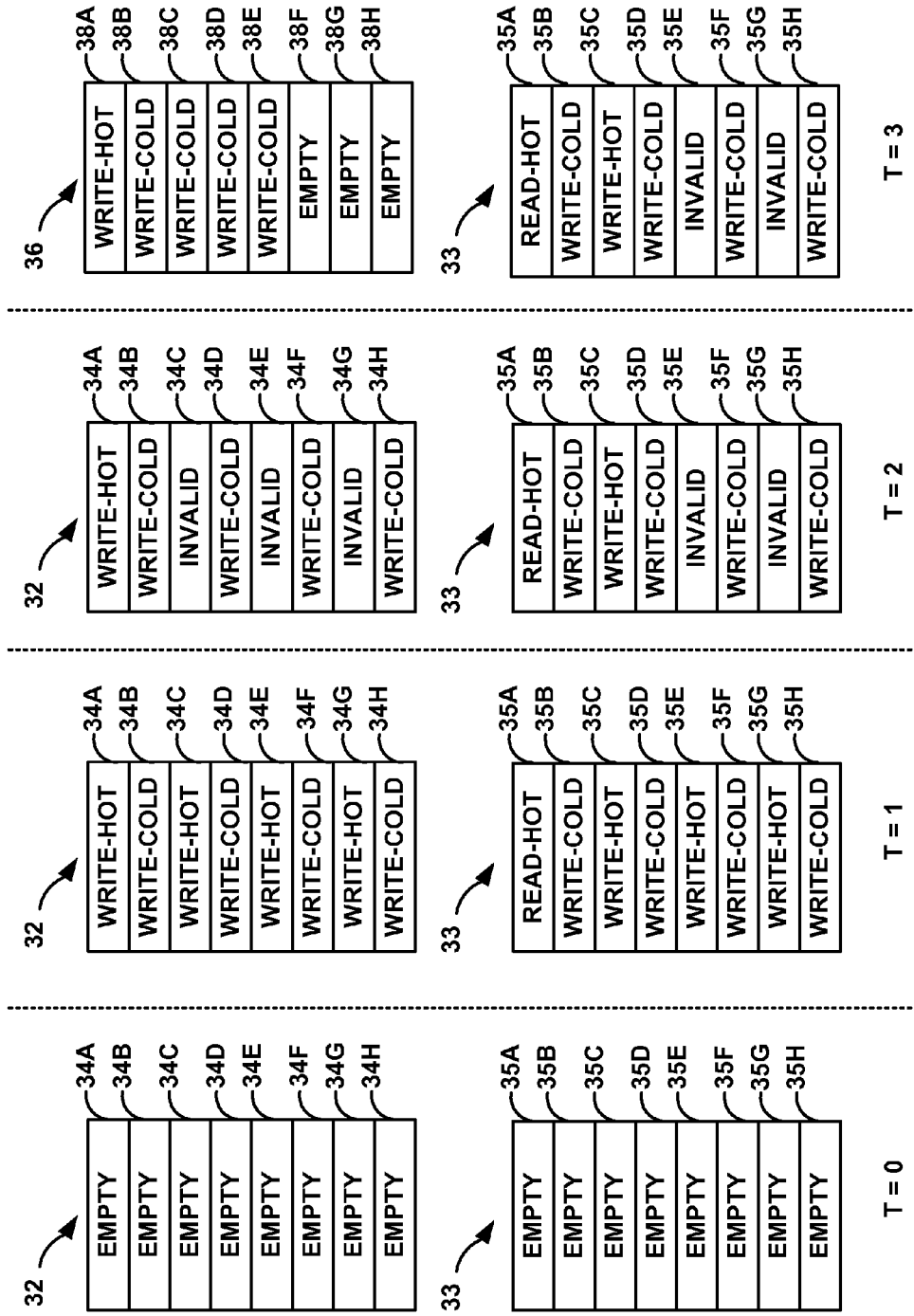
FIGS. 2 and 3 are example illustrations of the storage operations of the SSD shown in FIG. 1.

FIG. 2 illustrates memory storage blocks 32, 33, and 36 which may be substantially similar to memory storage blocks 24 (FIG. 1). Memory storage block 32 includes physical blocks 34A-34H ("physical blocks 34"), memory storage block 33 includes physical blocks 35A-35H ("physical blocks 35"), and memory storage block 36 includes physical blocks 38A-38H ("physical blocks 38"), which may be substantially similar to physical blocks 26, 28.

FIG. 2 illustrates an operation of controller 12 in examples where controller 12 does not group logical blocks in common memory storage blocks based on the frequency of access of the logical blocks, e.g., controller 12 does not group logical blocks based on whether the logical blocks are write-hot, write-warm, write-cold, read-hot, read-warm, or read-cold or based on the numerical classification of the logical blocks. At an initial time, e.g., T=0, physical blocks 34 and 35 of memory storage blocks 32 and 33, respectively, are empty because computing device 30 has yet to access them. Computing device 30 may then access and store logical blocks in memory storage blocks 32 and 33 and controller 12 may modify the classification of the logical blocks based on the frequency of access.

For example, at T=1, the frequency of write access for logical blocks within physical blocks 34A, 34C, 34E, and 34G may cause controller 12 to classify them as write-hot and the frequency of write access for logical blocks within physical blocks 34B, 34D, 34F, and 34H may cause controller 12 to classify them as write-cold. The frequency of read requests for the logical blocks within physical block 35A may cause controller 12 to classify it as read-hot. The frequency of write requests for logical blocks within physical blocks 35C, 35E, and 35G may cause controller 12 to classify them as write-hot and the frequency of write access for logical blocks within physical blocks 35B, 35D, 35F, and 35H may cause controller 12 to classify them as write-cold.

In the previous example, controller 12 may not store logical blocks with similar classifications in a common memory storage block. Accordingly, logical blocks classified as read-hot, write-hot, and write-cold may be interspersed between memory storage blocks 32 and 33.

In the example of FIG. 2, assume that physical block 35A is read multiple times and memory storage block 33 is approaching read disturb. At a time between T=1 and T=2, computing device 30 may rewrite the logical blocks currently stored in physical blocks 34C, 34E, 34G, 35E, and 35G At T=2, as indicated in FIG. 2, the data within physical blocks 34C, 34E, 34G, 35E, and 35G becomes invalid. Controller 12 may store those logical blocks previously stored in physical blocks 34C, 34E, 34G, 35E, and 35G in physical blocks of a different memory storage block (not shown in FIG. 2).

In one example, since memory storage block 32 includes more physical blocks with invalid data compared to memory storage block 33, controller 12 may identify memory storage block 32 as the candidate memory storage block for garbage collection. At a time between T=2 and T=3, controller 12 may perform garbage collection on memory storage block 32. For garbage collection, controller 12 may transfer all the valid data stored in physical blocks 34, e.g., transfer logical blocks of data stored in physical blocks 34A, 34B, 34D, 34F, and 34H. Controller 12 may transfer all the valid data to physical blocks 38 of memory storage block 36 and erase all physical blocks 34 of memory storage block 32.

As shown in FIG. 2, at T=3, memory storage block 36 includes the valid data from memory storage block 32. For example, physical blocks 38A, 38B, 38C, 38D, and 38E include the logical blocks previously stored in physical blocks 34A, 34B, 34D, 34F, and 34H of memory storage block 32 at T=2. Physical blocks 38F-38H of memory storage block 36 are empty. In the example illustrated in FIG. 2, controller 12 may not modify memory storage block 33. Accordingly, as shown in FIG. 2, memory storage block 33 at T=3 is in the same state as memory storage block 33 at T=2.

As noted above, in the example illustrated in FIG. 2, controller 12 did not store logical blocks in common memory storage blocks 32 and 33 based on their frequency of access classification. Accordingly, at T=1 and T=3, memory storage blocks 32, 33, and 36 include both logical blocks classified as read-hot, and logical block classified as write-hot and write-cold.

In the example illustrated in FIG. 2, to perform garbage collection on memory storage block 32, controller 12 transferred five logical blocks of data, e.g., physical blocks 34A, 34B, 34D, 34F, and 34H. Furthermore, as described above, physical block 35A may have read a sufficient number of times such that a read disturb may occur in the near future. Since memory storage block 33 remained in the same state between T=2 and T=3, memory storage block 33 may still experience a read disturb in the near future because physical block 35A may still be read to cause the read disturb.

Figure 3:
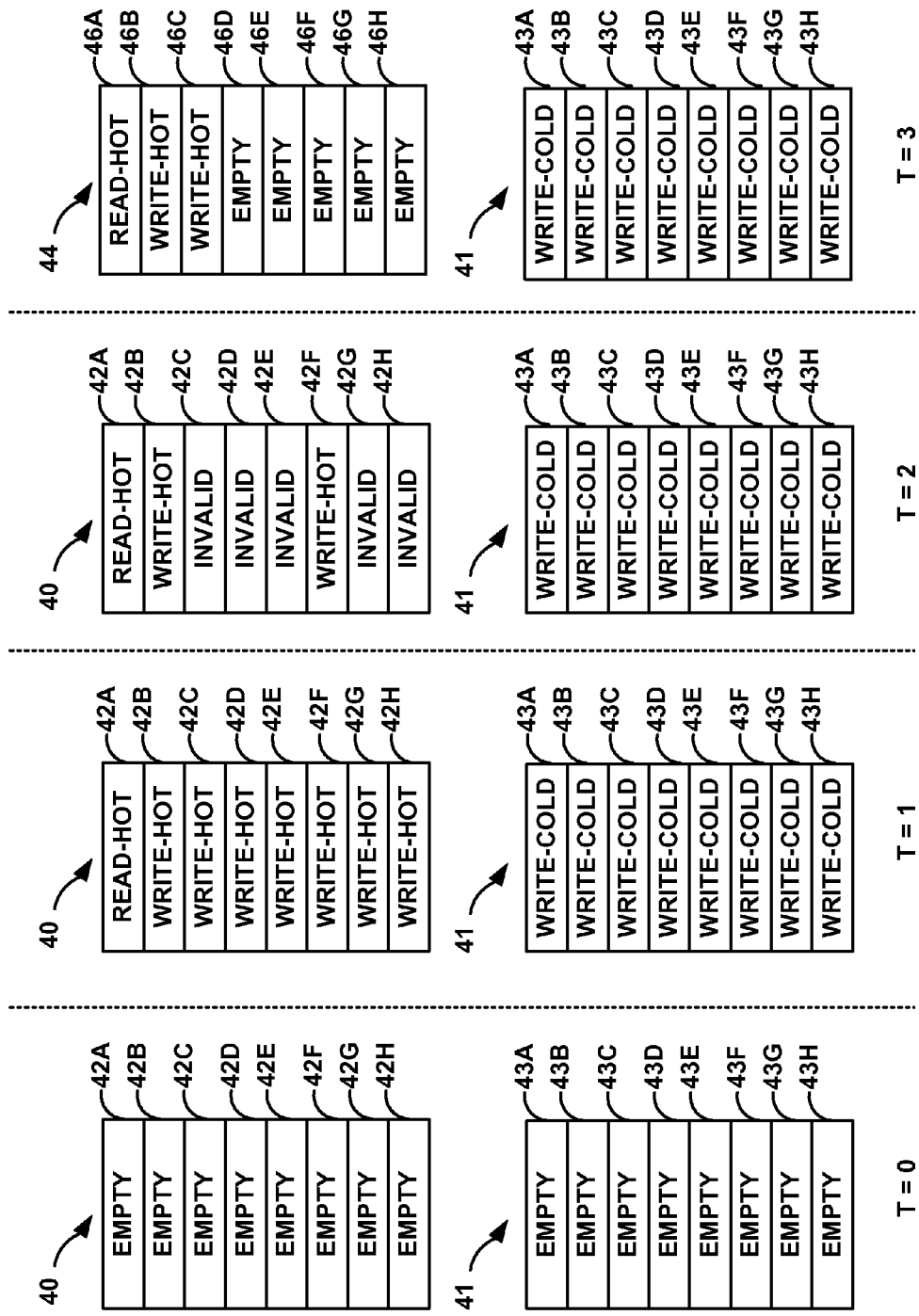

As described in more detail with respect to FIG. 3, in one example, during garbage collection, controller 12 may need to transfer data from fewer number of physical blocks compared to the example of FIG. 2. Furthermore, as described in more detail with respect to FIG. 3, in one example, aspects of this disclosure may mitigate against the read disturb that may occur in the example of FIG. 2.

FIG. 3 illustrates memory storage blocks 40, 41, and 44 which may be substantially similar to memory storage blocks 24 (FIG. 1). Memory storage block 40 includes physical blocks 42A-42H ("physical blocks 42"), memory storage block 41 includes physical blocks 43A-43H ("physical blocks 43"), and memory storage block 44 includes physical blocks 46A-46H ("physical blocks 46"), which may be substantially similar to physical blocks 26, 28.

FIG. 3 illustrates an operation of controller 12 in examples where controller 12 groups logical blocks in common memory storage blocks based on the frequency of access of the logical blocks, e.g., controller 12 groups logical blocks based on whether the logical blocks are write-hot, write-warm, write-cold, read-hot, read-warm, or read-cold. Similar to FIG. 2, at an initial time, e.g., T=0, physical blocks 42 and 43 of memory storage blocks 40 and 41, respectively, are empty because computing device 30 has yet to access them. Computing device 30 may then access and store logical blocks in memory storage blocks 42 and 43 and controller 12 may modify the classification of the logical blocks based on the frequency of access.

In the example illustrated in FIG. 3, controller 12 may group logical blocks based on their frequency of access classification. For example, between T=1 and T=2, controller 12 may store logical blocks classified as read-hot and write-hot in memory storage block 40, and store logical blocks classified as write-cold in memory storage block 41. As shown in FIG. 3, at T=2, logical blocks classified as read-hot and write-hot are stored in memory storage block 40 and logical blocks classified as write-cold are stored in memory storage block 41. In the example illustrated in FIG. 3, logical blocks classified as write-hot and read-hot may not be interspersed with logical blocks classified as write-cold.

In the example of FIG. 3, assume that physical block 42A is read multiple times and memory storage block 40 is approaching read disturb. At a time between T=1 and T=2, computing device 30 may rewrite the logical blocks currently stored in physical blocks 42C, 42D, 42E, 42G, and 42H. At T=2, as indicated in FIG. 3, the data within physical blocks 42C, 42D, 42E, 42G, and 42H becomes invalid. Controller 12 may store those logical blocks previously stored in physical blocks 42C, 42D, 42E, 42G and 42H in physical blocks of a different memory storage block (not shown in FIG. 3).

In one example, since memory storage block 40 includes more physical blocks with invalid data compared to memory storage block 41, controller 12 may identify memory storage block 40 as the candidate memory storage block for garbage collection. At a time between T=2 and T=3, controller 12 may perform garbage collection on memory storage block 40. For garbage collection, controller 12 may transfer all the valid data stored in physical blocks 42A, 42B, and 42F. Controller 12 may transfer all the valid to physical blocks 46 of memory storage block 44 and erase all physical blocks 42 of memory storage block 40.

As shown in FIG. 3, at T=3, memory storage block 44 includes the valid data from memory storage block 40. For example, physical blocks 46A, 46B, and 46C include the logical blocks previously stored in physical blocks 42A, 42B, and 42F of memory storage block 40 at T=2. Physical blocks 46D-46H of memory storage block 44 are empty. In the example illustrated in FIG. 3, controller 12 may not modify memory storage block 41. Accordingly, as shown in FIG. 3, memory storage block 41 at T=3 is in the same state as memory storage block 41 at T=2.

As noted above, in the example illustrated in FIG. 3, controller 12 stored logical blocks in common memory storage blocks 40 and 41 based on their frequency of access classification. Accordingly, at T=1 and T=3, memory storage blocks 40 and 44 include logical blocks classified as read-hot and write-hot, and memory storage block 41 includes logical blocks classified as write-cold.

In the example illustrated in FIG. 3, to perform garbage collection on memory storage block 40, controller 12 transferred three logical blocks of data, e.g., physical blocks 42A, 42B, and 42G However, in the example illustrated in FIG. 2, where controller 12 did not group logical blocks based on their classification, to perform garbage collection, controller 12 transferred five logical blocks of data, e.g., physical blocks 34A, 34B, 34D, 34F, and 34H of FIG. 2. In the example illustrated in FIG. 3, controller 12 transferred fewer logical blocks of data compared to the example illustrated in FIG. 2 even though in both examples there were a total of five invalid physical blocks. In this manner, by grouping logical blocks based on their frequency of access classification, the number of logical blocks of data that need be transferred during garbage collection may be reduced, thereby reducing the write amplification and the wear on the physical blocks.

The reduction of write amplification may be particularly beneficial as devices such as SSD 10 are made smaller. However, even though such devices are made smaller, they are required to contain large memory storage blocks. The transfer of data for large memory storage blocks may cause substantial wear on the devices such as SSD 10. Aspects of this disclosure may reduce the wear on devices such as SSD 10 by reducing the write amplification during garbage collection.

Furthermore, in the example illustrated in FIG. 3, physical block 42A may have been read sufficient times to cause a read disturb in the near future. Since controller 12 performed garbage collection on memory storage block 40 between T=2 and T=3, the number of times that physical block 42A is read is reset to zero. In aspects of this disclosure, by grouping logical blocks based on their frequency of access classification a balance point is reached such that at a time a memory storage block is likely to experience read disturb the memory storage block includes mostly invalid pages, e.g., memory storage block 40 at T=2. In this manner, the logical blocks of data, e.g., logical blocks of data stored in physical blocks 42A, 42B, and 42F, may not experience read disturb because those logical blocks are moved to a different memory storage block, e.g., memory storage block 44, during garbage collection. In this manner, aspects of this disclosure may mitigate against read disturb without requiring additional read disturb detection and correction.

In some examples, memory storage blocks designated to store logical blocks classified as write-hot or read-hot may not include sufficient physical blocks to store all logical blocks classified as write-hot or read-hot. In such examples, controller 12 may store the logical blocks classified as write-hot or read-hot in a memory storage block, until that memory storage block is full. Controller 12 may store the remaining logical blocks classified as write-hot or read-hot in another memory storage block until that memory storage block is full. Controller 12 may repeatedly store logical blocks classified as write-hot or read-hot until all the logical blocks classified as write-hot or read-hot are stored in common memory storage blocks.

In some examples, after controller 12 stores all the logical blocks classified as write-hot or read-hot in common memory storage blocks, a memory storage block may include physical blocks that are empty. In such examples, controller 12 may store logical blocks classified as write-warm or read-warm in the remaining physical blocks until controller 12 stores all logical blocks classified as write-warm or read-warm. In such examples, if there are physical blocks that are still empty, controller 12 may store logical blocks classified as write-cold or read-cold. FIGS. 4 and 5 provide an example illustration of the manner in which controller 12 may store logical blocks based on their frequency of access classification.

FIGS. 4A-4D illustrate an example of memory storage blocks that store logical blocks based on their frequency of access classification. FIGS. 4A-4D illustrate memory storage blocks 48, 52, 56, and 60, respectively, which may be substantially similar to memory storage blocks 24 (FIG. 1). Memory storage block 48 includes physical blocks 50A-50H ("physical blocks 50"), memory storage block 52 includes physical blocks 54A-54H ("physical blocks 54"), memory storage block 56 includes physical blocks 58A-58H ("physical blocks 58"), and memory storage block 60 includes physical blocks 62A-64H ("physical blocks 64"), which may substantially similar to physical blocks 26, 28 (FIG. 1).

In the example illustrated in FIGS. 4A-4D, each one of memory storage blocks 48, 52, 56, and 60 includes eight physical blocks. In one example, in response to a request for garbage collection, controller 12 may store logical blocks in memory storage blocks 48, 52, 56, and 60 based on the frequency of access classification of the logical blocks. In the example illustrated in FIGS. 4A-4D, assume that controller 12 needs to store eight logical blocks classified as write-hot, two logical blocks classified as read-hot, nine logical blocks classified as write-warm, two logical blocks classified as read-cold, and eleven logical blocks classified as write-cold. It should be noted that the example illustrated in FIGS. 4A-4D is one example, and should not be considered as limiting.

In aspects of this disclosure, controller 12 may store logical blocks with similar classifications in common memory storage blocks. As illustrated in FIG. 4A, controller 12 may store logical blocks classified as write-hot or read-hot in memory storage block 48. For example, physical blocks 50 may store logical blocks classified as write-hot or read-hot. However, in this example, memory storage block 48 may not include sufficient physical blocks 50 to store all the logical blocks classified as read-hot or write-hot, e.g., the eight logical blocks classified as write-hot and the two logical blocks classified as read-hot. Memory storage block 48 may include eight physical blocks 50. Controller 12 may store the remaining two logical blocks classified as write-hot or read-hot in another memory storage block.

As illustrated in FIG. 4B, memory storage block 52 may store the remaining two logical blocks classified as write-hot in physical blocks 54A and 54B. For the remaining six physical blocks 54, e.g., physical blocks 54C-54H, rather than leaving them as empty, in some non-limiting examples, controller 12 may populate physical blocks 54C-54H with logical blocks classified as write-warm or read-warm. For example, as illustrated in FIG. 4B, physical blocks 54C-54H include logical blocks classified as write-warm. However, there may still be some logical blocks classified as write-warm or read-warm that are not stored in memory storage block 52. As described above, in this example there are nine logical blocks classified as write-warm and six of the nine logical blocks classified as write-warm are stored in memory storage block 52. Controller 12 may store the remaining three logical blocks classified as write-warm or read-warm in another memory storage block.

As illustrated in FIG. 4C, memory storage block 56 may store the remaining three logical blocks classified as write-warm in physical blocks 58A-58C. For the remaining five physical blocks 58, e.g., physical blocks 58D-58H, rather than leaving them as empty, in some non-limiting examples, controller 12 may populate physical blocks 58D-58H with logical blocks classified as read-cold or write-cold. For example, as illustrated in FIG. 4C, physical blocks 58D and 58E include logical blocks classified as read-cold and physical blocks 58F-58H include logical blocks classified as write-cold. However, there may still be some logical blocks classified as write-cold or read-cold that are not stored in memory storage block 56.

As described above, in this example there are eleven logical blocks classified as read-cold or write-cold and five of the eleven logical blocks classified as write-cold or read-cold are stored in memory storage block 56. Controller 12 may store the remaining eight logical blocks classified as write-cold or read-cold in another memory storage block. As illustrated in FIG. 4D, memory storage block 60 may store the remaining eight logical blocks classified as write-cold in physical blocks 62A-62C.

As described above, in some examples, controller 12 may classify a logical block based on a numerical classification that indicates the frequency of access of that logical block. In the example illustrated in FIGS. 5A-5D, controller 12 may classify logical blocks based on a numerical classification and group logical blocks in common memory storage blocks based on their numerical classification.

FIGS. 5A-5D illustrate another example of memory storage blocks that store logical blocks based on their frequency of access classification. FIGS. 5A-5D illustrate memory storage blocks 64, 68, 72, and 76, respectively, which may be substantially similar to memory storage blocks 24 (FIG. 1). Memory storage block 64 includes physical blocks 66A-66H ("physical blocks 66"), memory storage block 68 includes physical blocks 70A-70H ("physical blocks 70"), memory storage block 72 includes physical blocks 74A-74H ("physical blocks 74"), and memory storage block 76 includes physical blocks 78A-78H ("physical blocks 78"), which may substantially similar to physical blocks 26, 28 (FIG. 1).

In the example illustrated in FIGS. 5A-5D, each one of memory storage blocks 64, 68, 72, and 76 includes eight physical blocks. In one example, in response to a request for garbage collection, controller 12 may store logical blocks in memory storage blocks 64, 68, 72, and 76 based on the frequency of access classification of the logical blocks. In the example illustrated in FIGS. 5A-5D, assume that controller 12 needs to store two logical blocks classified as read 10, two logical blocks classified as write 10, six logical blocks classified as write 9, two logical blocks classified as write 8, two logical blocks classified as write 7, six logical blocks classified as write 6, one logical block classified as read 6, three logical blocks classified as write 4, three logical blocks classified as write 3, three logical blocks classified as write 2, and two logical blocks classified as write 1.

In the example illustrated in FIGS. 5A-5D, a logical block is classified as write 1, if that logical block is accessed less than or equal to a first write access threshold, as write 2, if that logical blocks is accessed less than or equal to a second write access threshold but greater than the first write access threshold, and so on, until a logical block is classified as write 10, if that logical block is accessed more than a tenth write access threshold. Logical blocks classified as read 6 or read 10 may be classified in a similar manner, albeit based on read access thresholds. It should be noted that the example illustrated in FIGS. 5A-5D is one example, and should not be considered as limiting.

In aspects of this disclosure, controller 12 may store logical blocks with similar classifications in common memory storage blocks. As illustrated in FIG. 5A, controller 12 may store logical blocks classified as write 10 or read 10 in memory storage block 64. For example, physical blocks 66A-66D may store logical blocks classified as write 10 or read 10. For the remaining four physical blocks, e.g., physical blocks 66E-66H, controller may store logical blocks classified as write 9 or read 9. However, in this example, memory storage block 64 may not include sufficient physical blocks 66 to store all the logical blocks classified as write 9 or read 9, e.g., the six logical blocks classified as write 9. Controller 12 may store the remaining two logical blocks classified as write 9 in another memory storage block.

As illustrated in FIG. 5B, memory storage block 68 may store the remaining two logical blocks classified as write 9 in physical blocks 70A and 70B. For the remaining six physical blocks 70, e.g., physical blocks 70C-70H, rather than leaving them as empty, in some non-limiting examples, controller 12 may populate physical blocks 70C-70H with logical blocks classified as write 8, write 7, and write 6. For example, as illustrated in FIG. 5B, physical blocks 70C and 70D include logical blocks classified as write 8, physical blocks 70E and 70F include logical blocks classified as write 7, and physical blocks 70G and 70H include logical blocks classified as write 6. However, there may still be some logical blocks classified as write 6 that are not stored in memory storage block 68. As described above, in this example there are six logical blocks classified as write 6 and two of the six logical blocks classified as write 6 are stored in memory storage block 68. Controller 12 may store the remaining four logical blocks classified as write 6 in another memory storage block.

As illustrated in FIG. 5C, memory storage block 72 may store the remaining four logical blocks classified as write 6 in physical blocks 74A-74D. For the remaining four physical blocks 74, e.g., physical blocks 74E-74H, rather than leaving them as empty, in some non-limiting examples, controller 12 may populate physical blocks 74E-74H with logical blocks classified as read 6 or write 4. In the example illustrated in FIG. 5C, there may not be a logical block classified as read 5 or write 5 because the frequency of access for the logical blocks may be too high or too low to classify a logical block as read 5 or write 5.

For example, as illustrated in FIG. 5C, physical blocks 74E and 74F-74H include logical blocks classified as read 6 and write 4. For the remaining logical blocks classified as write 3, write 2, or write 1, controller 12 may store these logical blocks in another memory storage block. As illustrated in FIG. 5D, memory storage block 76 may store the remaining logical blocks classified as write 3, write 2, or write 1 in physical blocks 78A-78H.

As noted above, the examples illustrated in FIGS. 4A-4D and 5A-5D should not be considered limiting. In some non-limiting aspects of this disclosure, controller 12 may group logical blocks, in common memory storage blocks, based on their frequency of access classification such that at a time a physical block of a memory storage block is likely to be read sufficient times to cause a read disturb, the other physical blocks of that memory storage block mostly store invalid data. In this manner, that memory storage block may be a candidate for garbage collection because that memory storage block includes physical blocks that mostly store invalid data. Upon garbage collection, the number of times that the physical block that may have caused read disturb is reset to zero, thereby mitigating read disturb. Also, since the memory storage block that is the candidate for garbage collection includes mostly physical blocks that store invalid data, there may be fewer logical blocks that need to be transferred, thereby reducing write amplification.

Figure 6:
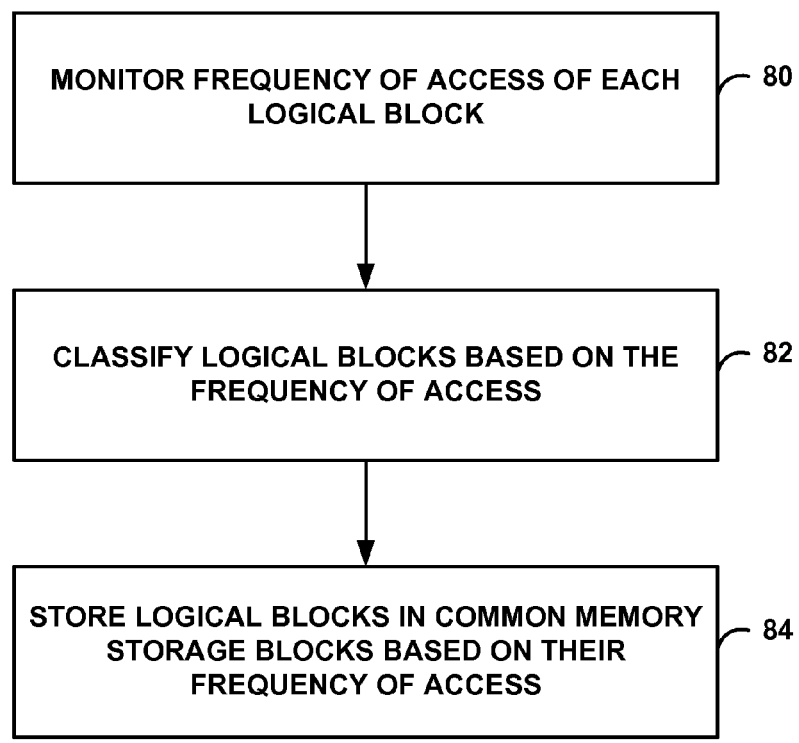
FIG. 6 is a flowchart illustrating an example operation of the SSD shown in FIG. 1.

FIG. 6 is a flowchart illustrating an example operation of the SSD 10 shown in FIG. 1. Computing device 30 may transmit read request operations or write request operations to SSD 10. Computing device 30 may transmit the requests based on a LBA for a particular logical block that computing device 30 desires to read from or write to. Controller 12 may monitor the frequency of access of each logical block based on the number of times computing device 30 accessed the LBA of each logical block (80). For example, controller 12 may include a counter that counts the number of times each logical block is accessed and whether the request was a read request or a write request.

Controller 12 may classify each logical block based on its frequency of access, e.g., based on the number of times computing device 30 requested each logical block (82). Controller 12 may classify each logical block based on the number of times that logical block was read from or written to. In some examples, the classification may be based on a temperature classification or a numerical classification. For example, controller 12 may establish or may be preprogrammed with one or more write access thresholds and read access thresholds. In one example, if the number of times a logical block is read is less than a first read access threshold, controller 12 may classify that particular logical block as read-cold. If the number of times a logical block is read is greater than or equal to a second read access threshold but less than a third read access threshold, controller 12 may classify that particular logical block as read-warm. If the number of times a logical block is read is greater than or equal to the third access threshold, controller 12 may classify that particular logical block as read-hot. Controller 12 may classify logical blocks as write-cold, write-warm, and write-hot in a substantially similar fashion, albeit based on the write access thresholds. In some examples, the write access thresholds and the read access thresholds may be different. Controller 12 may also classify logical blocks based on a numerical classification in a substantially similar manner.

Controller 12 may store logical blocks in common memory storage blocks based on their frequency of access classification (84). Controller 12 may store logical blocks in common memory storage blocks such that at a time when a physical block is likely to experience a read disturb, the memory storage block that includes the physical blocks contains mostly invalid data. In some examples, to mitigate against read disturb, controller 12 may store logical blocks with similar classifications in common memory storage blocks. In some examples, controller 12 may store logical blocks with similar classification in common memory storage blocks in response to a write request operation and/or in response to a request for garbage collection.

For example, during the garbage collection, controller 12 may store logical blocks classified as read-hot and write-hot in a common memory storage block, store logical blocks classified as read-warm and write-warm in a common memory storage block, and store logical blocks classified as read-cold and write-cold in a common memory storage block. As another example, assume there are two logical blocks classified as read-hot. Controller 12 may store one of the logical blocks classified as read-hot in a physical block of a first memory storage block and store logical blocks classified as write-hot in the remaining physical blocks of the first memory storage block. Controller 12 may store the other one of the logical blocks classified as read-hot in a physical block of a second memory storage block and store logical blocks classified as write-hot and write-warm in the remaining physical blocks of the second memory storage block. Other permutations and combinations may be possible and aspects of this disclosure should not be considered limited to the provided examples.

The techniques described herein may be implemented in hardware, software, firmware, or any combination thereof. Various features described as modules, units or components may be implemented together in an integrated logic device or separately as discrete but interoperable logic devices or other hardware devices, including optical hardware components. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer readable, machine readable, or processor readable data storage medium comprising instructions that, when executed, cause a processor or controller to perform one or more of the methods described above.

The code or instructions may be software and/or firmware executed by processing circuitry including one or more controllers, one or more processors, such as one or more DSPs, general purpose microprocessors, ASICs, FPGAs, or other equivalent integrated or discrete logic circuitry. Accordingly, the term "controller" or "processor," as used herein may refer to any of the foregoing structure or any other structure suitable for implementation of the techniques described herein. In addition, in some aspects, functionality described in this disclosure may be provided within software modules or hardware modules.

Various aspects have been described in this disclosure. These and other aspects are within the scope of the following claims.

The invention claimed is:

1. A storage device comprising:
   one or more memory blocks, wherein at least one of the one or more memory blocks comprises one or more memory storage blocks, and wherein at least one of the one or more memory storage blocks comprises one or more physical blocks; and
   a controller configured to:
     monitor at least a frequency of read requests of one or more logical blocks referenced by one or more logical block addresses;
     select one or more physical blocks of a common memory storage block of the one or more memory storage blocks when at least the frequency of read requests is greater than or equal to a defined read access threshold; and
     in response to the selection, store the one or more logical blocks in the selected one or more physical blocks of the common memory storage block, which results in an increased likelihood of the one or more physical blocks being selected for garbage collection,
     wherein the increased likelihood of the one or more physical blocks being selected for garbage collection mitigates against read disturb in the one or more physical blocks.

2. The storage device of claim 1, wherein the controller is further configured to:
   compare the frequency of read requests to the defined read access threshold; and
   classify the one or more logical blocks based on the comparison,
   wherein the controller is configured to select one or more physical blocks of the common memory storage block based on the classification.

3. The storage device of claim 1, wherein the defined read access threshold comprises a first read access threshold, and wherein the controller is further configured to:
   compare the frequency of read requests to a second read access threshold;
   compare the frequency of read requests to the first read access threshold if the frequency of read requests is less than the second read access threshold; and
   classify the one or more logical blocks based on the comparisons,
   wherein the controller is configured to select one or more physical blocks of a common memory storage block based on the classification.

4. The storage device of claim 3, wherein the classification is based on a numerical classification.

5. The storage device of claim 1, wherein the controller is further configured to:
   monitor at least a frequency of write requests of the one or more logical blocks,
   wherein the controller is configured to select one or more physical blocks of the common memory storage block when at least the frequency of read requests is greater than or equal to the defined read access threshold and when at least the frequency of write requests is greater than or equal to a defined write access threshold.

6. The storage device of claim 5, wherein the controller is further configured to:
   compare the frequency of read requests to the defined read access threshold;
   compare the frequency of write requests to the defined write access threshold; and
   classify the one or more logical blocks based on the comparisons,
   wherein the controller is configured to select one or more physical blocks of a common memory storage block based on the classification of the one or more logical blocks based on the frequency of read and write comparisons.

7. The storage device of claim 6, wherein the controller is configured to store the one or more logical blocks with similar classifications in the selected one or more physical blocks of the common memory storage block.

8. The storage device of claim 1, wherein the controller is configured to store the one or more logical blocks in the selected one or more physical blocks of the common memory storage block based on at least one of a write request, a garbage collection request, and a request to store generated by the controller.

9. A method comprising:
   monitoring, by a device, at least a frequency of read requests of one or more logical blocks referenced by one or more logical block addresses;
   selecting, by the device, one or more physical blocks of a common memory storage block when at least the frequency of read requests is greater than or equal to a defined read access threshold; and
   responsive to the selecting, storing, by the device, the one or more logical blocks in the selected one or more physical blocks of the common memory storage block, resulting in an increased likelihood of the one or more physical blocks being garbage collected,
   wherein the increased likelihood of the one or more physical blocks being selected for garbage collection mitigates against read disturb in the one or more physical blocks.

10. The method of claim 9, further comprising:
    comparing the frequency of read requests to the defined read access threshold; and
    classifying the one or more logical blocks based on the comparison,
    wherein selecting one or more physical blocks of a common memory storage block comprises selecting one or more physical blocks of the common memory storage block based on the classification.

11. The method of claim 9, wherein the defined read access threshold comprises a first read access threshold, and wherein the method further comprises:
comparing the frequency of read requests to a second read access threshold;
comparing the frequency of read requests to the first read access threshold if the frequency of read requests is less than the second read access threshold; and
classifying the one or more logical blocks based on the comparisons,
wherein selecting one or more physical blocks of a common memory storage block comprises selecting one or more physical blocks of the common memory storage block based on the classification.

12. The method of claim 11, wherein the classification is based on a numerical classification.

13. The method of claim 9, further comprising:
monitoring at least a frequency of write requests of the one or more logical blocks,
wherein selecting one or more physical blocks of a common memory storage block comprises selecting one or more physical blocks of the common memory storage block when at least the frequency of read requests is greater than or equal to the defined read access threshold and when at least the frequency of write requests is greater than or equal to a defined write access threshold.

14. The method of claim 13, further comprising:
comparing the frequency of read requests to the defined read access threshold;
comparing the frequency of write requests to the defined write access threshold; and
classifying the one or more logical blocks based on the comparisons,
wherein selecting one or more physical blocks of a common memory storage block comprises selecting one or more physical blocks of the common memory storage block based on the classification of the one or more logical blocks based on the frequency of read and write comparisons.

15. The method of claim 14, wherein storing the one or more logical blocks in the selected one or more physical blocks of the common memory storage block comprises storing the one or more logical blocks with similar classifications in the selected one or more physical blocks of the common memory storage block.

16. The method of claim 9, wherein storing the one or more logical blocks in the selected one or more physical blocks of the common memory storage block comprises storing the one or more logical blocks in the selected one or more physical blocks of the common memory storage block based on at least one of a write request, a garbage collection request, and a request to store generated by the device.

17. A machine readable storage medium comprising instructions that cause one or more machines to:
monitor at least a frequency of read requests of one or more logical blocks referenced by one or more logical block addresses;
select one or more physical blocks of a common memory storage block when at least the frequency of read requests is greater than or equal to a defined read access threshold; and
responsive to the selection, store the one or more logical blocks in the selected one or more physical blocks of the common memory storage block, resulting in an increased likelihood of the one or more physical blocks being garbage collected,
wherein the increased likelihood of the one or more physical blocks being selected for garbage collection mitigates against read disturb in the one or more physical blocks.

18. The machine readable storage medium of claim 17, further comprising instructions to:
monitor at least a frequency of write requests of the one or more logical blocks,
wherein the instructions to select comprises instructions to select one or more physical blocks of the common memory storage block when at least the frequency of read requests is greater than or equal to the defined read access threshold and when at least the frequency of write requests is greater than or equal to a defined write access threshold.

19. The machine readable storage medium of claim 18, further comprising instructions to:
compare the frequency of read requests to the defined read access threshold;
compare the frequency of write requests to the defined write access threshold; and
classifying the one or more logical blocks based on the comparisons, wherein the instructions to select comprises instructions to select one or more physical blocks of the common memory storage block based on the classification of the one or more logical blocks based on the frequency of read and write comparisons.

20. The machine readable storage medium of claim 19, wherein the instructions to store comprises instructions to store the one or more logical blocks with similar classifications in the selected one or more physical blocks of the common memory storage block.

21. The machine readable storage medium of claim 17, wherein the instructions to store comprises instructions to store the one or more logical blocks in the selected one or more physical blocks of the common memory storage block based on at least one of a write request, a garbage collection request, and a request to store generated by the one or more machines.

* * * * *